April 16, 1968   M. R. NOLL   3,378,220
CLAMP
Filed April 22, 1966

Marvin R. Noll
INVENTOR.

BY *Clarence A. O'Brien*
*and Harvey B. Jacobson*
Attorneys

United States Patent Office 3,378,220
Patented Apr. 16, 1968

3,378,220
CLAMP
Marvin R. Noll, P.O. Box 394, Falfurrias, Tex. 78355
Filed Apr. 22, 1965, Ser. No. 544,575
7 Claims. (Cl. 248—226)

ABSTRACT OF THE DISCLOSURE

A pair of similar elongated bodies each including a first end and a second channel-shaped end, said elongated bodies being adapted to be reversed end-to-end in generally parallel relation and to extend transversely across the face of a first elongated member remote from and crossed relative to a second elongated member with said channel-shaped end portions embracingly engaging the side of the second elongated member facing away from the first elongated member and opening toward the latter while the first and second ends of the elongated bodies include coacting means operative to draw each pair of adjacent first and second ends of the bodies toward each other.

---

Figure 1:
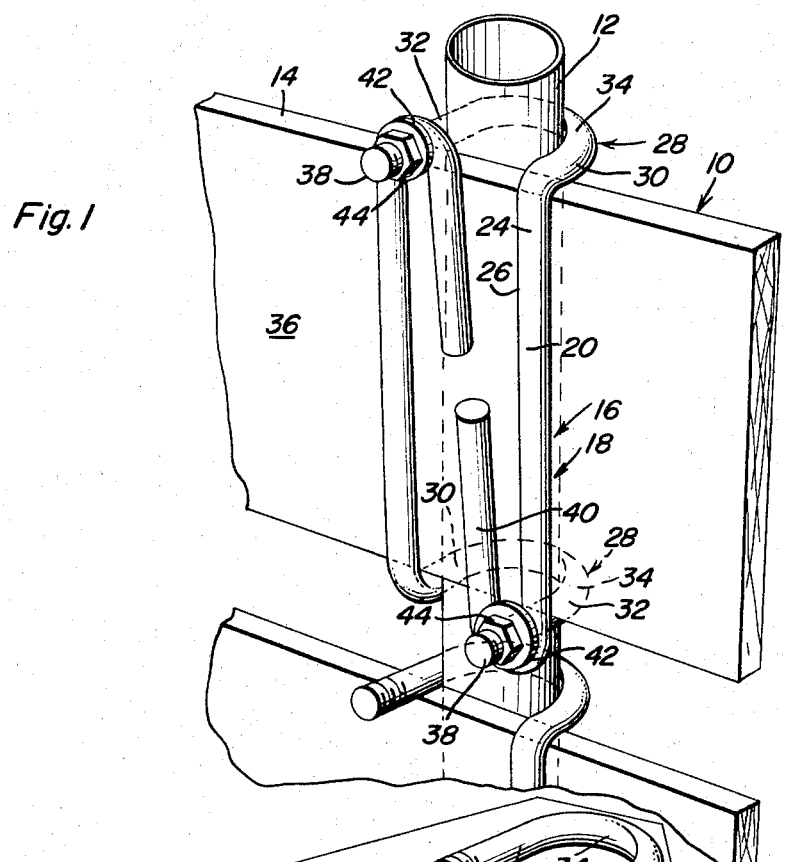

This invention relates to a novel and useful clamp assembly and more specifically to a clamp assembly including two identical bodies or sections adapted to be utilized simultaneously and in a manner operatively connecting the bodies to each other for the purpose of securing a pair of crossed members together.

The clamp assembly of the instant invention may be used to great advantage in securing horizontal fence members to fence posts and in other environments where it is desirable to secure two crossed members together.

The clamp assembly of the instant invention includes a pair of elongated bodies which may be readily constructed of two pieces of rod-like material with one end of each rod having a laterally extending generally U-shaped bend formed therein disposed in a plane generally normal to the longitudinal center line of the body and being externally threaded on its free end so as to be adapted to have a threaded nut engaged therewith while the other end of each rod defines an opening through which the threaded free end of the other rod may be secured when the rods are reversed end-to-end. However, although rod-like material is utilized in the construction of the form of the invention illustrated and described herein, the identical body members of the clamp assembly may be constructed with slightly different configurations in order to be more readily adaptable for use with crossed members of different cross-sectional shapes.

For the purpose of illustration the body members of the clamp assembly of the embodiment of the invention disclosed include configurations adapting the clamp assembly to be utilized in securing one elongated member of rectangular cross-section to a second crossed elongated member of cylindrical cross-section. In this manner the adaptability of the clamp assembly of the instant invention to handle elongated members of different cross-sections is clearly illustrated.

The main object of this invention is to provide a clamp assembly which will be capable of forming a rigid connection between two crossed members such as fence posts and horizontal members.

Another object of this invention is to provide a clamp assembly which may be readily constructed in different sizes and configurations so as to be adapted to be operative in securing two crossed members together which are of different cross-sectional shapes and which include different cross-sectional dimensions.

A final object of this invention to be specifically enumerated herein is to provide a clamp construction in accordance with the preceding objects which will conform to conventional forms of manufacture, be of simple construction and easy to use so as to provide a device that will be economically feasible, long lasting and relatively trouble free in operation.

Figure 2:
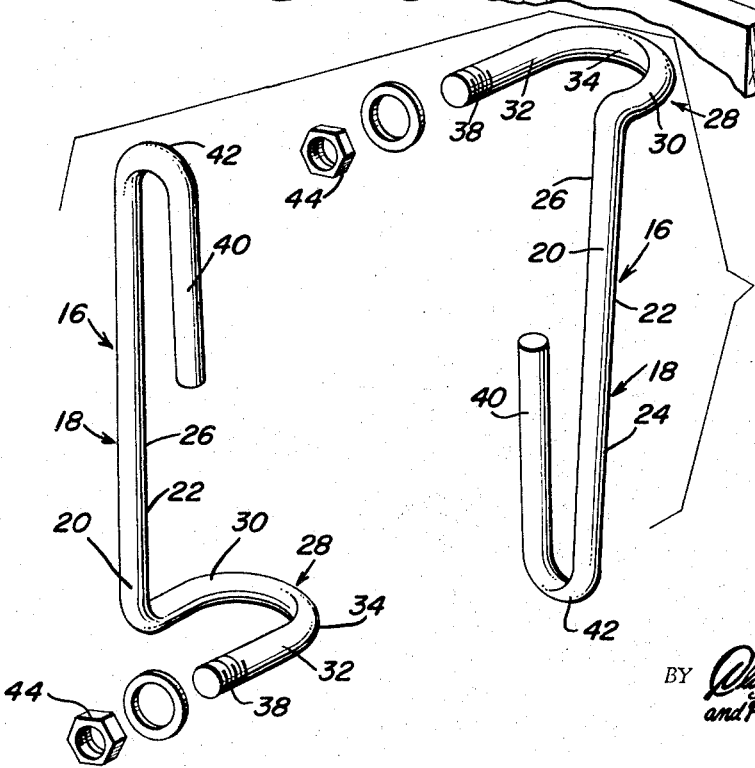

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of a fence construction utilizing tubular posts and board-like horizontal members and with the clamp assembly of the instant invention illustrated providing a rigid connection between the posts and one of the horizontal members of the fence; and FIGURE 2 is an exploded perspective view of the clamp assembly.

Referring now more specifically to the drawings, the numeral 10 generally designates a fence construction including tubular upright posts 12 which are cylindrical in cross-sectional shape and board-like horizontal members 14.

The clamp assembly of the instant invention is generally referred to by the reference numeral 16 and includes a pair of identical elongated bodies generally referred to by the reference numerals 18. Each of the bodies includes a front portion or surface 20, a rear portion or surface 22, and a pair of opposite side surfaces or portions 24 and 26. One end of each body 18 includes an abutment portion generally referred to by the reference numeral 28 which is generally U-shaped in configuration including a pair of legs 30 and 32 interconnected at one pair of corresponding ends by means of a curved bight portion 34. The end of the leg 30 remote from bight portion 34 comprises a laterally and rearwardly directed upper end portion of the body 18 and it will be noted that the bight portion 34 opens toward the front side or portion of the body 18 so as to embracingly engage the side of the post 12 remote from the board 14. Of course, the leg 32 extends along the side of the post 12 remote from the leg 30 and terminates at its free end outwardly of the front face 36 of the board 14 in an externally threaded terminal end portion 38.

The end of each body 18 remote from the abutment portion 28 includes a backturned portion 40 forming a U-shaped bend 42 in each body 18 remote from its abutment portion 28 and which opens toward the free ends of the legs 30 and 32 of the abutment portion 28.

With attention now invited more specifically to FIGURE 1 of the drawings, it may be seen that the bodies 18 of the clamp assembly 16 are reversed end to end in position relative to each other end and that the externally threaded terminal end portion 38 of each body 18 is received in the U-shaped bend 42 of the other body 18. Suitable threaded fasteners such as nuts 44 are threadedly engaged with the terminal end portions 38 and thereby tend to draw the end portions of the free ends of the abutment portions 28 toward the front of the board 14 thereby causing the bight portions 34 to tightly embrace the corresponding portions of the tubular posts 12. Of course, inasmuch as the fasteners or nuts 44 bear against the ends of the bodies 18 defining the U-shaped bends 42, the adjacent portions of the bodies 18, upon tightening of the fasteners 44, are urged toward the rear face of the board 14 so as to tightly clampingly engage the opposite longitudinal edge portions of the board 14 and the adjacent portions of the posts 12 between each pair of adjacent ends of the bodies 18.

If the posts 12 were rectangular in cross-section, the abutment portions 28 would of course define a pocket between the leg portions thereof complemental in cross-sectional shape to the rectangular posts. On the other hand, should the boards 14 be replaced by tubular members similar to the posts 12, the straight portions of the bodies 18 extending between the abutment portions 28 thereof and the U-shaped bends 42 thereof would be generally semi-circular in configuration although the U-shaped bends of such modified bodies 18 would preferably be disposed in planes paralleling the posts 12 and disposed substantially normal to the direction in which the abutment portions 28 open. Accordingly, it may be seen that the bodies 18 of the clamp assembly 16 may be readily constructed so as to be adaptable for use with crossed members of various cross-sectional shapes. Further, it is believed readily apparent that if the post 12 was of a larger diameter the radius of curvature of the abutment portion 28 would be correspondingly larger. Further, if the boards 14 were of greater width, the straight portions of the bodies 18 extending between the abutment portions 28 and the U-shaped bends 42 would be longer.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pair of clamp members each including an elongated body terminating at one end portion in a generally channel-shaped portion disposed in a plane generally normal to said body, said channel-shaped portions extending outwardly of corresponding sides of said bodies, and opening toward the opposite sides of said bodies, said clamp members being reversed end-to-end with said channel-shaped portions opening in the same directions, and means on the free end portion of each of said channel-shaped members releasably engageable with the other end portion of the other elongated body and operative to urge the other end portions in directions opposite to those in which the corresponding channel-shaped portions open.

2. The combination of claim 1 wherein each of said other end portions define an opening extending in a direction generally paralleling said planes and disposed generally normal to said bodies, said free ends of said channel-shaped portions being each receivable through the opening defined by the other body, and thrust means carried by said free ends and operative to effect a thrust on the portions of said other end portions defining said openings and facing in a direction in which said channel-shaped portions open.

3. A clamp assembly adapted to be utilized to secure elongated crossed members together, said clamp assembly including an elongated body including front, rear and opposite side portions adapted to extend transversely across a first side of one of said crossed members remote from the other member, one end of said body including an abutment portion laterally offset outwardly of the rear portion of said body and extending outwardly of one side portion thereof for abutting engagement with the side of the other member remote from said one member, said abutment portion including means on its free end portion adapting the latter to be drawn toward said front portion of said body, the other end of said body including means adapted to be anchored against movement away from said first side of said once crossed member, said abutment portion including a generally U-shaped member including a pair of legs interconnected at one pair of corresponding ends by means of a bight portion, the free end of one of said legs being secured to said one end of said body with the other leg spaced outwardly of said one side portion and said U-shaped member opening toward said front side portion, said U-shaped member being adapted to embracingly receive therein said other member, the free end of said other leg being adapted to have abutment means secured thereto abuttingly engaged with the side of said one member remote from said other member.

4. The combination of claim 3 wherein said means carried by said other end of said body includes means operative to act as an anchor for fastening means engaged with said other member.

5. A clamp assembly comprising at least one elongated body adapted to be utilized to secure elongated crossed members together, said elongated body including front, rear, and opposite side portions, one end of said body including a channel-shaped end portion disposed to the rear side portion of said body, extending outwardly of one side portion of said body and opening toward the front side portion of said body, said end portion being adapted to cradle an elongated member generally paralleling said body and spaced outwardly of the rear side portion thereof from the side of said elongated member remote from said front side portion of said body, and abutment means carried by the end of said channel-shaped portion remote from said body and also the other end of said body adapted to be engaged with a second elongated member crossed relative to the first-mentioned elongated member and passed between said body and the first-mentioned elongated member, said clamp assembly including a pair of said elongated bodies reversed end to end relative to each other and with the channel-shaped end portions thereof opening in the same direction, the abutment means on the free end of each channel member being releasably engageable with the other end of the other elongated body.

6. The combination of claim 5 wherein the free end portion of each of said channel-shaped members defines a threaded shank portion and said abutment means carried by said free end portions comprise abutment members threadedly engaged with said shank portions.

7. The combination of claim 6 wherein the abutment means on the other end of each body is defined by a portion of the body defining a passage extending between the front and rear side portions thereof through which the free end of the shank portion of the other body is receivable.

References Cited

UNITED STATES PATENTS

| 1,176,874 | 3/1916 | Timm | 287—51 |
| 2,929,121 | 3/1960 | Tinnerman | 287—51 |

ROY D. FRAZIER, *Primary Examiner.*

ROBERT P. SEITTER, *Assistant Examiner.*